United States Patent
Hung et al.

(10) Patent No.: US 9,417,848 B2
(45) Date of Patent: Aug. 16, 2016

(54) SERIAL MULTIPLY ACCUMULATOR FOR GALOIS FIELD

(71) Applicant: Storart Technology Co., Ltd., Hsinchu (TW)

(72) Inventors: Jui Hui Hung, Hsinchu (TW); Chih Nan Yen, Hsinchu (TW)

(73) Assignee: Storart Technology Co. Ltd., Hsinchu (TW)

( * ) Notice: Subject to any disclaimer, the term of this patent is extended or adjusted under 35 U.S.C. 154(b) by 312 days.

(21) Appl. No.: 14/228,763

(22) Filed: Mar. 28, 2014

(65) Prior Publication Data
US 2015/0277857 A1    Oct. 1, 2015

(51) Int. Cl.
*G06F 7/72* (2006.01)
*G06F 7/544* (2006.01)

(52) U.S. Cl.
CPC .............. *G06F 7/724* (2013.01); *G06F 7/5443* (2013.01)

(58) Field of Classification Search
None
See application file for complete search history.

(56) References Cited

U.S. PATENT DOCUMENTS

| | | | | |
|---|---|---|---|---|
| 7,003,715 B1* | 2/2006 | Thurston | ............... | G06F 7/724 714/782 |
| 7,082,452 B2* | 7/2006 | Stein | ..................... | G06F 7/724 708/492 |
| 7,206,410 B2* | 4/2007 | Bertoni | ................. | G06F 7/724 380/255 |
| 7,447,310 B2* | 11/2008 | Koc | ..................... | G06F 7/725 380/28 |
| 7,512,647 B2* | 3/2009 | Wilson | .................. | G06F 7/724 708/492 |
| 2003/0093450 A1* | 5/2003 | Chen | .................... | G06F 7/724 708/492 |
| 2005/0267926 A1* | 12/2005 | Al-Khoraidly | ....... | G06F 7/724 708/492 |
| 2009/0006517 A1* | 1/2009 | Gopal | ..................... | G06F 7/72 708/492 |
| 2015/0277857 A1* | 10/2015 | Hung | ................... | G06F 7/5443 708/492 |

* cited by examiner

*Primary Examiner* — David H Malzahn
(74) *Attorney, Agent, or Firm* — Che-Yang Chen; Law Offices of Scott Warmuth

(57) ABSTRACT

A serial multiply accumulator (MAC) for operation of two multiplications and one addition over Galois field is disclosed. The MAC includes a first element feeding circuit, a second element feeding circuit, a number of first calculating circuits and a second calculating circuit. By re-arranging the circuit design, many elements used in the conventional MAC, such as XOR gates and registers, can be saved. The present invention has an advantage of lower area cost.

7 Claims, 3 Drawing Sheets

SERIAL MULTIPLY ACCUMULATOR FOR GALOIS FIELD

FIELD OF THE INVENTION

The present invention relates to a serial multiply accumulator for Galois field. More particularly, the present invention relates to a serial multiply accumulator capable of calculating two multiplications and one addition for Galois field.

BACKGROUND OF THE INVENTION

Finite fields play an important role in digital communication system, such as applications of cryptographic scheme and error correction codes. Comparing with normal number system, the finite field has many special properties so that the key operations, finite field addition and multiplication are always implemented individually in hardware. Since finite field addition can be directly implemented by XOR gates with low hardware and time complexity, the bottleneck is always finite field multipliers.

There are three kinds of architectures of finite field multipliers: serial, hilly-parallel and partially-parallel architecture. Serial architecture provides the lowest hardware complexity but needs to cost multiple clock cycles for a multiplication operation. However, since operation speed of peripheral hardware had been increased than ever and not all of the multiplication operations need a very large number of iterative calculating steps, the serial architecture is still popular in some applications.

In some applications, the key operation of a Multiply Accumulate (MAC) is the combination of several finite field additions and multiplications, such as $E=A\times B+C\times D$, where A, B, C, D and E are sets of elements in the finite field. In detail, A includes m elements, $a_0, a_1, a_2 \ldots$ and $a_{m-1}$. Similarly, B includes $b_0, b_1, b_2, \ldots$ and $b_{m-1}$, C includes $c_0, c_1, c_2, \ldots$ and $c_{m-1}$, D includes $d_0, d_1, d_2 \ldots$ and $d_{m-1}$, and E includes $e_0, e_1, e_2 \ldots$ and $e_{m-1}$. In this case, conventionally, two finite field multiplications and one finite field addition as shown in FIG. 1 are requested. One finite field multiplier shown on the left deals with $A\times B$ while the other one on the right processes $C\times D$. It is obvious that each multiplier has m−1 cell A and a cell B. Both cell A and cell B have an AND gate, an XOR gate and a register. The only difference is cell B doesn't receive the data fed back from itself. The connections of the dashed arrows are defined by the primitive polynomial for adopted $GF(2^m)$. There are also m XOR gates formed as a finite field adder for operating $A\times B+C\times D$.

In the design, the area cost is two finite field multipliers and one finite field adder. After calculation, the MAC includes 2 m AND gates, 3 m XOR gates and 2 m registers. The critical path of this design is one multiplier and one XOR gate. U.S. Pat. No. 7,082,452, titled "Galois field multiply/multiply-add multiply accumulate", provides a parallel architecture to achieve a fast calculating speed for the same operation. However, its hardware complexity of '452 is too high to be adopted in some area-efficient design.

Here, the inventor discloses a serial architecture for MAC with much lower hardware complexity but having similar performance as the conventional MAC as shown in FIG. 1. Namely, fewer elements, such as XOR gates and registers, are required to achieve the same operation comparing with the conventional MAC. Therefore, the present invent has advantage of lower area cost.

SUMMARY OF THE INVENTION

As mentioned above, there are still room for conventional MAC that is capable of combining finite field additions and multiplications to use less elements to have lower area cost.

According to an aspect of the present invention, a serial multiply accumulator for operation of two multiplications and one addition over Galois field includes: a first element feeding circuit for sequentially outputting first elements in the Galois field per clock cycle; a second element feeding circuit for sequentially outputting second elements in the Galois field per clock cycle; a number of first calculating circuits, linked successively from upstream to downstream, each receiving the first element, the second element, one third element, and one fourth element per clock cycle, receiving an operating data from an upstream-linked first calculating circuit, optionally receiving a feedback data, producing two products by multiplying the first element by the third element and multiplying the second element by the fourth element, and outputting another operating data downstream, the outputted operating data being available from adding one product to the other, adding the products to the received operating data, adding the products to the feedback data, or adding the products and the received operating data to the feedback data, wherein the first calculating circuit arranged most upstream doesn't receive the operating data from other first calculating circuit; and a second calculating circuit, linked to the first calculating circuit arranged the most downstream, for receiving the first element, the second element, one third element, and one fourth element per clock cycle, receiving the outputted operating data from the linked first calculating circuit, producing two products by multiplying the first element by the third element and multiplying the second element by the fourth element, and outputting the feedback data, the outputted operating data being available from adding one product to the other or adding the products to the received operating data.

The first elements, the second elements, the third elements and the fourth elements have the same amount, the third element provided to one of the first calculating circuit or the second calculating circuit is different from that provided to other first calculating circuits, and the fourth element provided to one of the first calculating circuit or the second calculating circuit is different from that provided to other first calculating circuits.

The serial multiply accumulator further includes: a third element feeding circuit, linked to each of the first calculating circuit and the second calculating circuit, for providing a specified third element; and a fourth element feeding circuit, linked to each of the first calculating circuit and the second calculating circuit, for providing a specified fourth element thereto.

Preferably, coefficients of a polynomial correspond to the first calculating circuits sequentially with a constant coefficient corresponding to the most upstream first calculating circuit.

Preferably, the feedback data is provided to one first calculating circuit if a corresponding coefficient of that first calculating circuit is not zero.

If the amount of the first calculating circuits and the second calculating circuit is equal to or less than the number of the greatest power of the polynomial, at least one coefficient of higher power of the polynomial doesn't correspond to one first calculating circuit.

The first calculating circuit further includes: a first AND gate for multiplying the first element by the third element; a second AND gate for multiplying the second element by the fourth element; a first XOR gate for adding one product to the other, adding the products to the received operating data, adding the products to the feedback data, or adding the products and the received operating data to the feedback data; and a first register for temporarily storing the operating data from the first XOR gate for one clock cycle. The second calculating circuit further includes: a third AND gate for multiplying the first element by the third element; a fourth AND gate for multiplying the second element by the fourth element; a second XOR gate for adding one product to the other or adding the products to the received operating data; and a second register for temporarily storing the operating data from the third XOR gate for one clock cycle.

By re-arranging the circuit design, many elements used in the conventional MAC, such as XOR gates and registers, can be saved. The present invention therefore can have an advantage of lower area cost.

DETAILED DESCRIPTION OF THE PREFERRED EMBODIMENTS

The present invention will now be described more specifically with reference to the following embodiments.

Figure 2:
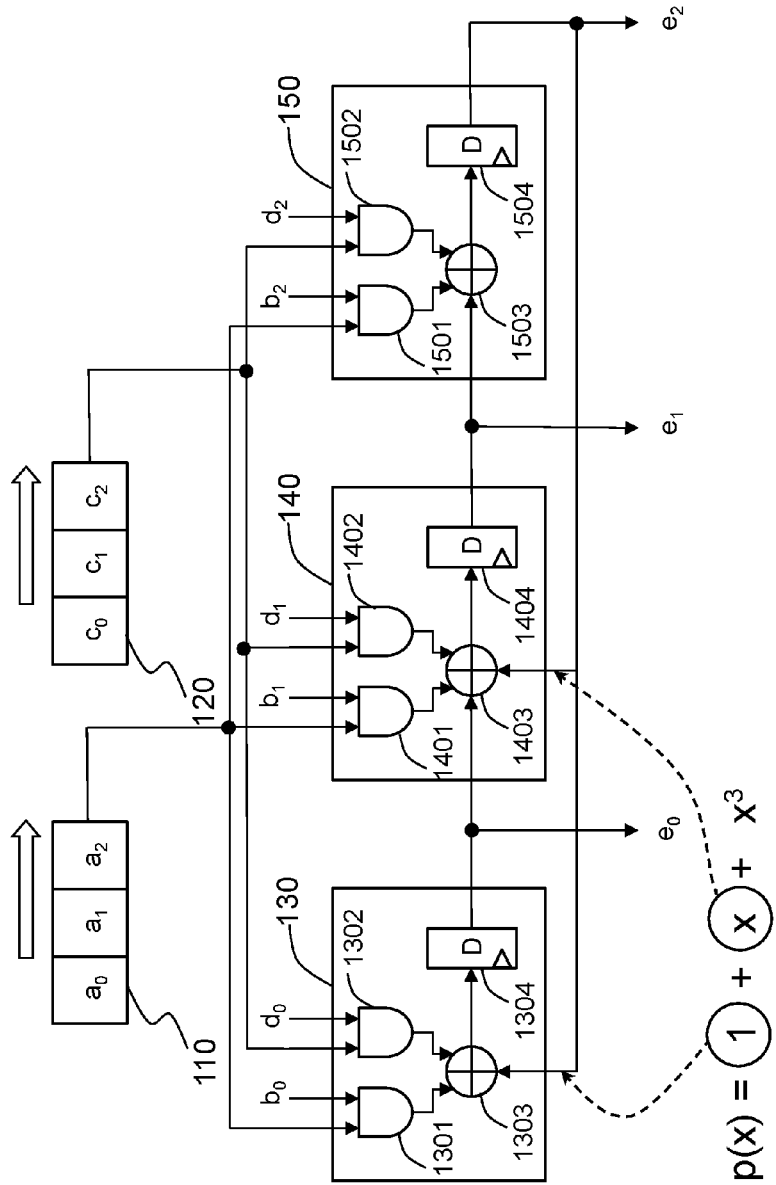
FIG. 2 is a multiply accumulator for operating two finite field multiplications and one finite field addition according to the present invention.

Please refer to FIG. 2. An embodiment according to the present invention is illustrated. A Multiply Accumulator (MAC) 10 is capable of operating two finite field multiplications and one finite field addition over Galois field, $GF(2^3)$. The MAC 10 includes a first element feeding circuit 110, a second element feeding circuit 120, an upstream first calculating circuit 130, a downstream first calculating circuit 140 and a second calculating circuit 150. The upstream first calculating circuit 130 and downstream first calculating circuit 140 have the same structure and some like functions. In order to have a comprehensive illustration, a direction is defined here. An upstream side is on the left and downstream side is on the right. This is the reason the left first calculating circuit is named the "upstream" first calculating circuit 130 while the other is the "downstream" first calculating circuit 140.

In this embodiment, the MAC 10 may operate a calculation of $E=A \times B+C \times D$, where A, B, C, D and E are sets of elements in the $GF(2^3)$. A is a set of first elements and includes $a_0$, $a_1$ and $a_2$. B is a set of third elements and includes $b_0$, $b_1$ and $b_2$. C is a set of second elements and includes $c_0$, $c_1$ and $c_2$. D is a set of fourth elements and includes $d_0$, $d_1$ and $d_2$. E is the results of operation and includes $e_0$, $e_1$ and $e_2$. It should be noticed that each set has the same number of elements (3). However, according to the present invention, the number is not limited to 3. Any number is workable, for example, 64 and 128.

The first element feeding circuit 110 is used to sequentially output the first elements in the $GF(2^3)$ per clock cycle. The sequence is that $a_2$ is offered in the first clock cycle, $a_1$ is then offered in the second clock cycle and $a_3$ is offered in the third (last) clock cycle. Similarly, the second element feeding circuit 120 sequentially output the second elements in the $GF(2^3)$ per clock cycle as $c_2$ in the first clock cycle, $c_1$ in the second clock cycle and $c_0$ in the third clock cycle.

The upstream first calculating circuit 130 and downstream first calculating circuit 140 are linked successively from upstream to downstream. Each of them can receive the first element, the second element, one third element, and one fourth element per clock cycle. They can also receive an operating data from an upstream-linked first calculating circuit. However, the upstream first calculating circuit 130 is located in the most upstream side; it will not receive the operating data. In addition, the upstream first calculating circuit 130 and the downstream first calculating circuit 140 optionally receive a feedback data. Here, whether if a first calculating circuit is fed with the feedback data is decided by an irreducible polynomial, p(x). In this embodiment, p(x) equals $x^3+x+1$. The coefficients of power of p(x) correspond to the first calculating circuits sequentially with a constant coefficient, 1, corresponding to the upstream first calculating circuit 130 and a coefficient of x corresponding to the downstream first calculating circuit 140. The feedback data is provided to one first calculating circuit if the corresponding coefficient of the first calculating circuit is not zero. Thus, the constant coefficient is 1, then the upstream first calculating circuit 130 receives the feedback data (shown by the dashed arrow in FIG. 2); the coefficient of x is 1, then the downstream first calculating circuit 140 receives the feedback data (shown by the dashed arrow in FIG. 2). If the amount of the first calculating circuits and the second calculating circuit is equal to or less than the amount of the greatest power of p(x), at least one coefficient of higher power of p(x) doesn't correspond to a first calculating circuit. The amount of the first calculating circuits and second calculating circuit is 3. The greatest power of p(x) is also 3. Although a coefficient of $x^3$ is 1, there's no first calculating circuit corresponding to it. However, in another embodiment, the amount of elements in A, B, C or D is considerably large; the amount of the first calculating circuits and the second calculating circuit may be greater than the number of the greatest power of p(x).

The upstream first calculating circuit 130 and downstream first calculating circuit 140 produce two products by multiplying the first element by the third element and multiplying the second element by the fourth element. After the multiplications are done, they may add one product to the other, add the products to the received operating data, add the products to the feedback data, or add the products and the received operating data to the feedback data to provide one operating data under different conditions. It will be illustrated in details later. It should be noticed that the upstream first calculating circuit 130 doesn't receive the operating data from other first calculating circuit but the downstream first calculating circuit 140 can receive the operating data from the upstream first calculating circuit 130. In the next clock cycle, the upstream first calculating circuit 130 and downstream first calculating circuit 140 will output one operating data, respectively.

The second calculating circuit 150 is linked to the downstream first calculating circuit 140. It is used to receive the first element, the second element, one third element, and one fourth element per clock cycle. It can also receive an operating data from the downstream first calculating circuit 140. It is the process for the second calculating circuit 150 to produce two products by multiplying the first element by the third element and multiplying the second element by the fourth element. The second calculating circuit 150 adds one product to the other or adds the products to the received operating data to form the feedback data. In the next clock cycle, the second calculating circuit 150 outputs the feedback data. It is emphasized that the third element provided to the upstream first calculating circuit 130, the downstream first calculating circuit 140 or the second calculating circuit 150 is different from that provided to the other first calculating circuit. The fourth element provided to the upstream first calculating circuit 130, the downstream first calculating circuit 140 or the second calculating circuit 150 is different from that provided to the other first calculating circuit. As shown in FIG. 2, $b_0$ and $d_0$ are inputted to the upstream first calculating circuit 130 per clock cycle, $b_1$ and $d_1$ are inputted to the downstream first calculating circuit 140 per clock cycle and $b_2$ and $d_2$ are inputted to the second calculating circuit 150 per clock cycle.

The upstream first calculating circuit 130 has a first AND gate 1301, a second AND gate 1302, a first XOR gate 1303 and a first register 1304. The first AND gate 1301 multiplies the first element by the third element. The second AND gate 1302 multiplies the second element by the fourth element. The first XOR gate 1303 adds one product to the other in the first clock cycle and add the products to the feedback data in the second and later clock cycles. The first register 1304 can temporarily store the operating data from the first XOR gate 1303 for one clock cycle.

The downstream first calculating circuit 140 has a first AND gate 1401, a second AND gate 1402, a first XOR gate 1403 and a first register 13404. Like the upstream first calculating circuit 130, the first AND gate 1401 multiplies the first element by the third element. The second AND gate 1402 multiplies the second element by the fourth element. However, it is different that the first XOR gate 1403 adds one product to the other in the first clock cycle and adds the products and the received operating data to the feedback data in the second and later clock cycles. The first register 1404 can temporarily store the operating data from the first XOR gate 1403 for one clock cycle.

The second calculating circuit 150 has a third AND gate 1501, a fourth AND gate 1502, a second XOR gate 1503 and a second register 1504. The third AND gate 1501 multiplies the first element by the third element. The fourth AND gate 1502 multiplies the second element by the fourth element. The second XOR gate 1503 can add one product to the other in the first clock cycle while add the products to the received operating data in the second or later clock cycles. The second register 1504 can temporarily store the operating data from the first XOR gate 1503 for one clock cycle.

Although it is not shown in FIG. 2, the MAC 10 can further include a third element feeding circuit and a fourth element feeding circuit. The third element feeding circuit is linked to the upstream first calculating circuit 130, the downstream first calculating circuit 140 and the second calculating circuit 150 and provides a specified third element. Similarly, the fourth element feeding circuit is also linked to the same circuit as the third element feeding circuit does It is used to provide a specified fourth element thereto. Of course, the third element feeding circuit and the fourth element feeding circuit can be combined as one.

The operation can utilize the form of polynomials that each polynomial represents a set of elements. Thus, the elements E(x) equals (A(x) B(x)+C(x) D(x)) modulo p(x), where p(x) is an irreducible polynomial of degree 3 over GF($2^3$). p(x)=$x^3$+x+1. Let A(x)=($a_2 x^2 + a_1 x + a_0$), B(x)=($b_2 x^2 + b_1 x + b_0$), C(x)=($c_2 x^2 + c_1 x + c_0$), D(x)=($d_2 x^2 + d_1 x + d_0$), and E(x)=($e_2 x^2 + e c_1 x + e_0$). Then we have below:

$$E(x) = (A(x)B(x) + C(x)D(x)) \bmod p(x)$$

$$= ((a_2 b_2 + c_2 d_2)x^4 + (a_2 b_1 + a_1 b_2 + c_2 d_1 + c_1 d_2)x^3 +$$

$$(a_2 b_0 + a_1 b_1 + a_0 b_2 + c_2 d_0 + c_1 d_1 + c_0 d_2)x^2 +$$

$$(a_1 b_0 + a_0 b_1 + c_1 d_0 + c_0 d_1)x + (a_0 b_0 + c_0 d_0)) \bmod (x^3 + x + 1)$$

$$= (a_2 b_0 + a_1 b_1 + a_0 b_2 + a_2 b_2 + c_2 d_0 + c_1 d_1 + c_0 d_2 + c_2 d_2)x^2 +$$

$$(a_1 b_0 + a_0 b_1 + a_2 b_1 + a_1 b_2 + a_2 b_2 + c_1 d_0 + c_0 d_1 + c_2 d_1 + c_1 d_2 +$$

$$c_2 d_2)x + (a_0 b_0 + a_2 b_1 + a_1 b_2 + c_0 d_0 + c_2 d_1 + c_1 d_2)$$

A detailed operation is illustrated step by step below.

In the first clock cycle, $a_2$ and $c_2$ is provided to the upstream first calculating circuit 130, the downstream first calculating circuit 140 and the second calculating circuit 150. The upstream first calculating circuit 130 calculates one operating data as $a_2 b_0 + c_2 d_0$. The downstream first calculating circuit 140 calculates one operating data as $a_2 b_1 + c_2 d_1$. The second calculating circuit 150 calculates one feedback data as $a_2 b_2 + c_2 d_2$, where the feedback data will be fed to the upstream first calculating circuit 130 and the downstream first calculating circuit 140 in the second clock cycle.

In the second clock cycle, $a_1$ and $c_1$ is provided to the upstream first calculating circuit 130, the downstream first calculating circuit 140 and the second calculating circuit 150. The upstream first calculating circuit 130 calculates an updated operating data by adding the products from the first AND gate 1301 and the second AND gate 1302 to the feedback data as $a_1 b_0 + c_1 d_0 + a_2 b_2 + c_2 d_2$ and outputs the operating data in the first clock cycle. The downstream first calculating circuit 140 calculates an updated operating data by adding the products from the first AND gate 1401 and the second AND gate 1402 and the operating data from the first calculating circuit 130 to the feedback data as $a_1 b_1 + c_1 d_1 + a_2 b_0 + c_2 d_0 + a_2 b_2 + c_2 d_2$ and outputs the operating data in the first clock cycle. The second calculating circuit 150 calculates an updated feedback data by adding the products from the first AND gate 1501 and the second AND gate 1502 to the operating data from the second calculating circuit 140 as $a_1 b_2 + c_1 d_2 + a_2 b_1 + c_2 d_1$ and outputs the feedback data in the first clock cycle.

In the third clock cycle, $a_0$ and $c_0$ is provided to the upstream first calculating circuit 130, the downstream first calculating circuit 140 and the second calculating circuit 150. The upstream first calculating circuit 130 calculates another updated operating data by adding the products from the first AND gate 1301 and the second AND gate 1302 to the feedback data as $a_0 b_0 + c_0 d_0 + a_1 b_2 + c_1 d_2 + a_2 b_1 + c_2 d_1$ and outputs the operating data in the second clock cycle. $a_0 b_0 + c_0 d_0 + a_1 b_2 + c_1 d_2 + a_2 b_1 + c_2 d_1$ is $e_0$. The downstream first calculating circuit 140 calculates another updated operating data by adding the products from the first AND gate 1401 and the second AND gate 1402 and the operating data from the first calculating circuit 130 to the feedback data as $a_0 b_1 + c_0 d_1 + a_1 b_0 + c_1 d_0 + a_2 b_2 + c_2 d_2 + a_1 b_2 + c_1 d_2 + a_2 b_1 + c_2 d_1$ and outputs the operating data in the second clock cycle. $a_0 b_1 + c_0 d_1 + a_1 b_0 + c_1 d_0 + a_2 b_2 + c_2 d_2 + a_1 b_2 + c_1 d_2 + a_2 b_1 + c_2 d_1$ is $e_1$. The second calculating circuit 150 calculates another updated feedback data by adding the products from the first AND gate 1501 and the second AND gate 1502 to the operating data from the second calculating circuit 140 as $a_0 b_2 + c_0 d_2 + a_1 b_1 + c_1 d_1 + a_2 b_0 + c_2 d_0 + a_2 b_2 + c_2 d_2$ and outputs the feedback data in the second clock cycle. $a_0 b_2 + c_0 d_2 + a_1 b_1 + c_1 d_1 + a_2 b_0 + c_2 d_0 + a_2 b_2 + c_2 d_2$ is $e_2$.

Figure 3:
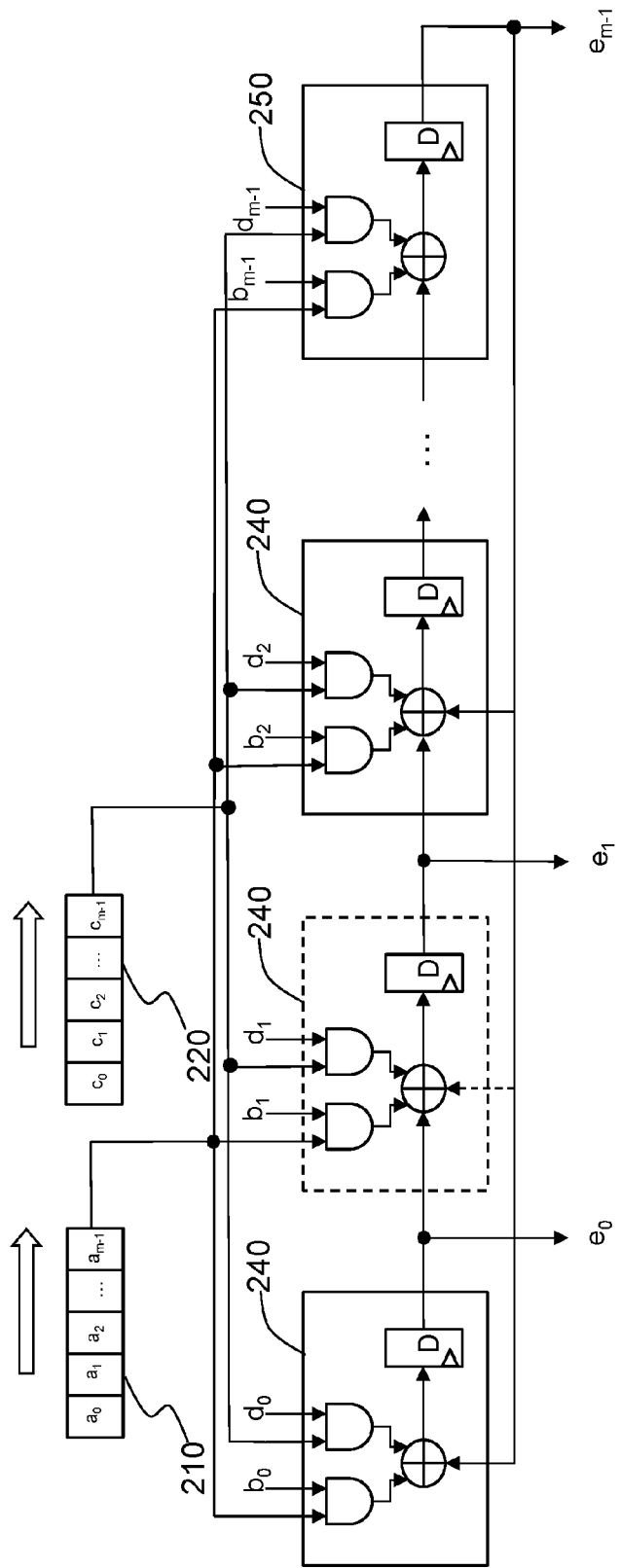
FIG. 3 is another multiply accumulator for operating two finite field multiplications and one finite field addition according to the present invention.

As mentioned above, the amount of a set of elements is not limited to 3. For any possible number of elements in a set to be operated, a more general illustration is shown in FIG. 3. A MAC 20 is capable of operating two finite field multiplications and one finite field addition over Galois field. The MAC 20 includes a first element feeding circuit 210, a second element feeding circuit 220, m−1 first calculating circuit 240, linked successively from upstream to downstream, and a second calculating circuit 250. Functions and structure of first element feeding circuit 210, the second element feeding circuit 220, the first calculating circuit 240 and second calculating circuit 250 are the same as that of the first element feeding circuit 110, the second element feeding circuit 120, the upstream first calculating circuit 130 or the downstream first calculating circuit 140 and the second calculating circuit 250, respectively. It is not repeated here. However, since a coefficient of x of p(x) for the present embodiment is zero, the first calculating circuit 240 enclosed by dashed lines doesn't receives the feedback data from the second calculating circuit 250. Operation of addition only includes adding one product to the other and adding the products to the received operating data. Not only this first calculating circuit 240 encounters such situation, there might be other first calculating circuit 240 as long as the corresponding coefficient of p(x) is zero.

Figure 1:
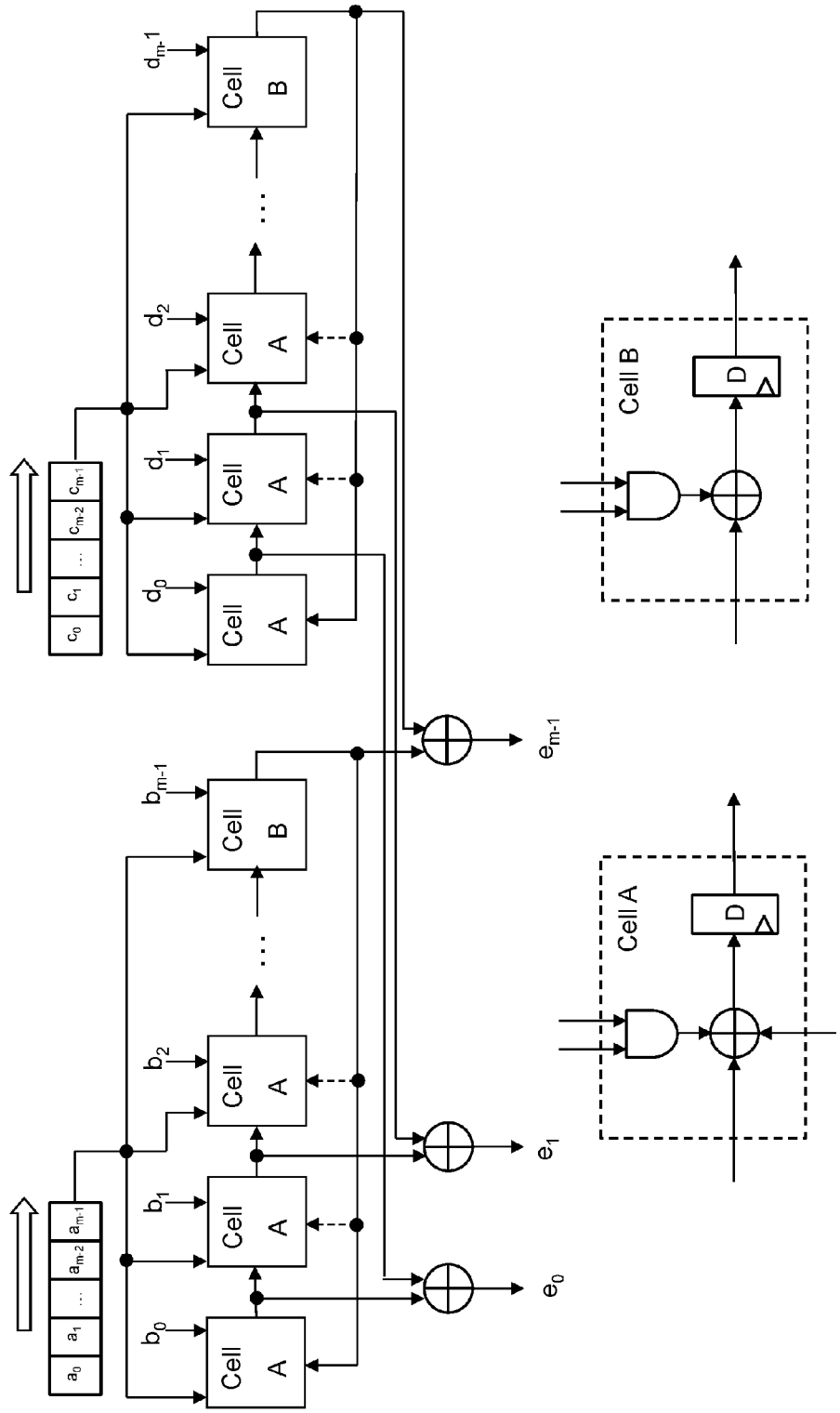
FIG. 1 shows a conventional multiply accumulator.

Please see FIG. 1 and FIG. 3 at the same time. Comparing the two figures, an advantage of the present invention is revealed. If the conventional MAC needs to operate A×B+C×D as described above, where A, B, C and D all have in elements, there are 2 m AND gates, 3 m XOR gates and 2 m registers required. However, the MAC design provided by the present invention only needs 2 m AND gates, in XOR gates and in registers. 2 m XOR gates and in registers can be saved and performance is similar.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A serial multiply accumulator for operation of two multiplications and one addition over Galois field, comprising:
    a first element feeding circuit for sequentially outputting first elements in the Galois field per clock cycle;
    a second element feeding circuit for sequentially outputting second elements in the Galois field per clock cycle;
    a plurality of first calculating circuits, linked successively from upstream to downstream, each receiving the first element, the second element, one third element, and one fourth element per clock cycle, receiving an operating data from an upstream-linked first calculating circuit, optionally receiving a feedback data, producing two products by multiplying the first element by the third element and multiplying the second element by the fourth element, and outputting another operating data downstream, the outputted operating data being available from adding one product to the other, adding the products to the received operating data, adding the products to the feedback data, or adding the products and the received operating data to the feedback data, wherein the first calculating circuit arranged most upstream doesn't receive the operating data from other first calculating circuit; and
    a second calculating circuit, linked to the first calculating circuit arranged the most downstream, for receiving the first element, the second element, one third element, and one fourth element per clock cycle, receiving the outputted operating data from the linked first calculating circuit, producing two products by multiplying the first element by the third element and multiplying the second element by the fourth element, and outputting the feedback data, the outputted operating data being available from adding one product to the other or adding the products to the received operating data;
    wherein the first elements, the second elements, the third elements and the fourth elements have the same amount, the third element provided to one of the first calculating circuit or the second calculating circuit is different from that provided to other first calculating circuits, and the fourth element provided to one of the first calculating circuit or the second calculating circuit is different from that provided to other first calculating circuits.

2. The serial multiply accumulator according to claim 1, further comprising:
    a third element feeding circuit, linked to each of the first calculating circuit and the second calculating circuit, for providing a specified third element thereto; and
    a fourth element feeding circuit, linked to each of the first calculating circuit and the second calculating circuit, for providing a specified fourth element thereto.

3. The serial multiply accumulator according to claim 1, wherein coefficients of a polynomial correspond to the first calculating circuits sequentially with a constant coefficient corresponding to the most upstream first calculating circuit.

4. The serial multiply accumulator according to claim 3, wherein the feedback data is provided to one first calculating circuit if a corresponding coefficient of that first calculating circuit is not zero.

5. The serial multiply accumulator according to claim 3, wherein if the amount of the first calculating circuits and the second calculating circuit is equal to or less than the number of the greatest power of the polynomial, at least one coefficient of higher power of the polynomial doesn't correspond to one first calculating circuit.

6. The serial multiply accumulator according to claim 1, wherein the first calculating circuit further comprises:
    a first AND gate for multiplying the first element by the third element;
    a second AND gate for multiplying the second element by the fourth element;
    a first XOR gate for adding one product to the other, adding the products to the received operating data, adding the products to the feedback data, or adding the products and the received operating data to the feedback data; and
    a first register for temporarily storing the operating data from the first XOR gate for one clock cycle.

7. The serial multiply accumulator according to claim 1, wherein the second calculating circuit further comprises:
    a third AND gate for multiplying the first element by the third element;
    a fourth AND gate for multiplying the second element by the fourth element;
    a second XOR gate for adding one product to the other or adding the products to the received operating data; and
    a second register for temporarily storing the operating data from the third XOR gate for one clock cycle.

* * * * *